Figure 1:
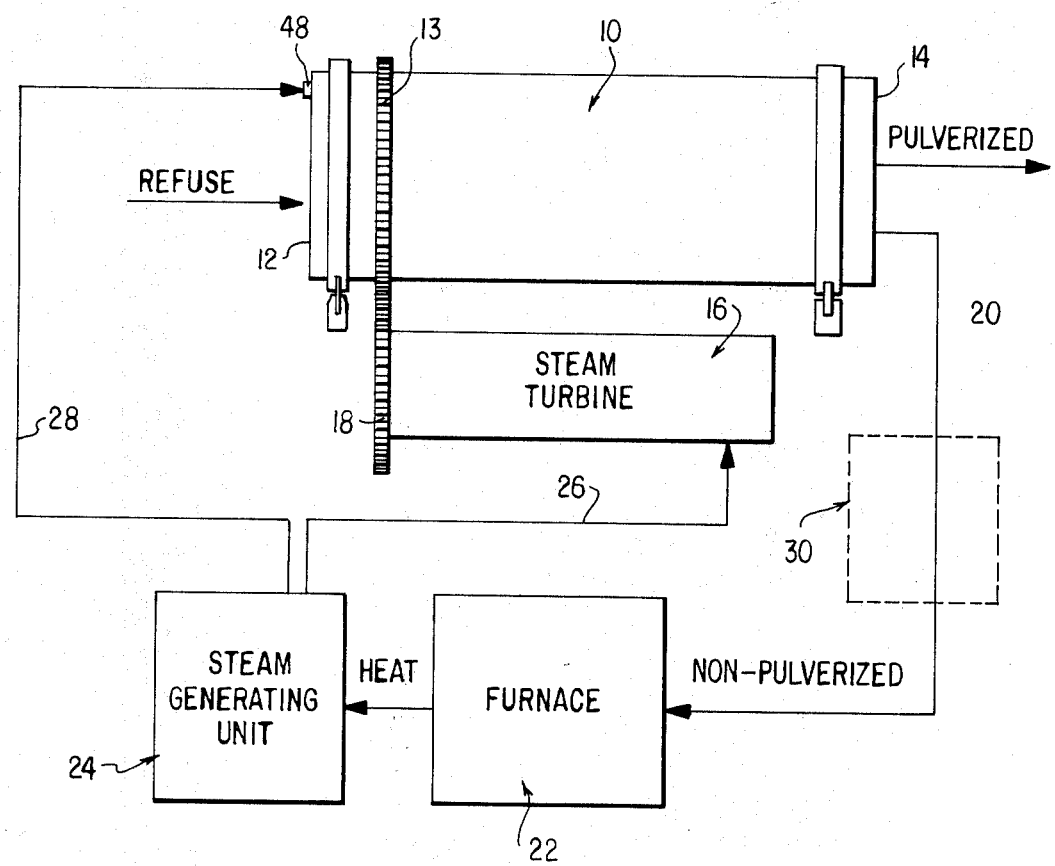

United States Patent [19]

Boyd

[11] 4,050,388
[45] Sept. 27, 1977

[54] REFUSE TREATMENT APPARATUS

[76] Inventor: John A. Boyd, 4500 S. Four Mile Run Drive, Arlington, Va. 22204

[21] Appl. No.: 721,698

[22] Filed: Sept. 9, 1976

[51] Int. Cl.² ............................................. F23G 7/00
[52] U.S. Cl. ................................. 110/8 P; 110/10
[58] Field of Search ............... 110/8 R, 8 P, 10, 14; 122/2

[56] References Cited
U.S. PATENT DOCUMENTS

| | | | |
|---|---|---|---|
| 3,647,405 | 3/1972 | Smith | 110/10 |
| 3,884,163 | 5/1975 | Ankersen | 110/10 |
| 3,938,449 | 2/1976 | Frisz et al. | 110/8 |

*Primary Examiner*—Kenneth W. Sprague

*Attorney, Agent, or Firm*—Abrams, Berdo & Kaul Roylance

[57] ABSTRACT

A known form of refuse treatment apparatus, such as that disclosed in U.S. Pat. No. 3,405,873, is improved by directing the non-pulverized refuse material emerging from the treatment drum to a furnace combusts the same. The heat of combustion is directed to a steam generating unit to thus create a supply of steam. One portion of the steam supply is directed to a steam turbine which serves as a power means for rotating the refuse drum. The other portion of the steam supply is introduced into the inlet end of the drum to admix with the refuse material being fed thereinto. The non-pulverized refuse material emerging from the outlet end of the drum can pass through a series of treatment steps as disclosed in my U.S. Pat. No. 3,802,631 in transit to the furnace.

7 Claims, 2 Drawing Figures

REFUSE TREATMENT APPARATUS

This invention relates to an improved form of refuse treatment apparatus and, more particularly, it relates to an improvement in a known form of refuse pulverizing apparatus wherein the non-pulverized material is subjected to combustion for the purpose of creating a supply of steam used in the operation of the apparatus.

The specific known form of apparatus to which the subject invention is addressed, and upon which the subject invention makes improvement, is that disclosed in U.S. Pat. No. 3,405,873, issued Oct. 15, 1968 in the same name of S. A. Gothard et al. Such patent discloses a useful form of refuse treatment apparatus wherein rotatable drum is utilized to pulverize all of the refuse material that is pulverizable. The patent discloses that the non-pulverizable material, such as cans and rags, which the patent refers to as "rejects" are simply separated and conveyed away from the apparatus.

It is an object of the present invention to provide an improved refuse apparatus or system, utilizing the structure disclosed in the aforesaid U.S. Pat. No. 3,405,873, but improving thereupon by utilizing the so-called "rejects" to create an additional supply of power, in the form of steam, which can then be used both in driving the apparatus and in treatment of the refuse material being fed through the apparatus.

Another object of the present invention is to utilize the apparatus disclosed in the aforesaid U.S. Pat. No. 3,405,873, and to take the "rejects" or non-pulverized material emerging from such apparatus, to subject the same to a manner of treatment as disclosed in my own U.S. Pat. No. 3,802,631, issued Apr. 9, 1974, and to then subject such processed material to a heating step to create steam useful in the initial refuse processing step.

Other objects, advantages and salient features of my invention will become apparent from the following detailed description, which, taken in conjunction with the annexed drawings, discloses a preferred embodiment thereof.

The foregoing objects are attained by utilizing a rotatable drum apparatus in accordance with that disclosed in aforesaid U.S. Pat. No. 3,405,873. When the non-pulverized material or "rejects" are discharged from the outlet end of such apparatus, they are directed to a specialized high temperature furnace where they are burned. If desired, the material can be processed and separated in accordance with my U.S. Pat. No. 3,802,631 while on the way to such furnace. The heat output of such furnace is transmitted to a steam generating unit which then creates a supply of steam. A portion of this steam supply is directed to a steam turbine which is operatively connected with the rotatable drum and which serves as the power means for rotation of such drum. Another portion of the steam supply is directed into the inlet end of the refuse separating drum so that the steam can mix with the refuse material being fed thereinto to thereby enhance its processing and pulverization.

Figure 2:
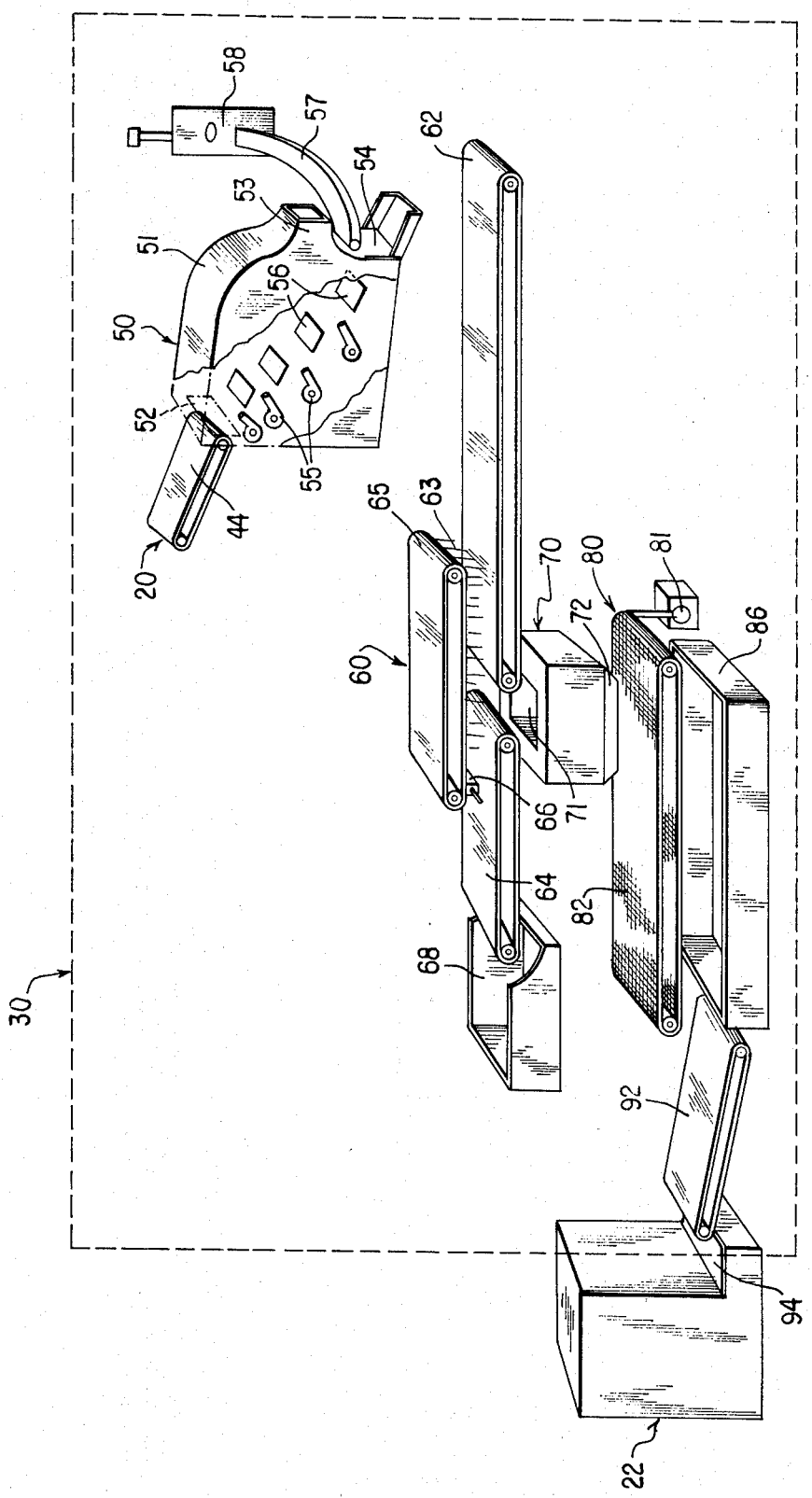

Referring now to the drawings, which form a part of this original disclosure:

FIG. 1 is a diagramatic view of an improved refuse treatment apparatus in accordance with the principles of my invention; and FIG. 2 a diagramatic perspective view of the optional form of treatment apparatus which can be used in the course of processing the non-pulverized refuse material.

Referring now to the drawing in further detail, there is shown in FIG. 1 a rotatable drum generally designated 10 which is used for processing refuse material feeding into the inlet 12 thereof. The drum and the entire interior thereof is made in accordance with aforesaid U.S. Pat. No. 3,405,873, the entire disclosure of which is hereby incorporated by reference. As such, it will be understood that the drum includes a perforated wall section on the interior thereof adjacent the outlet end 14 and a series of vane means within the drum disposed at an angle which directs refuse back toward the inlet end 12 as the drum rotates. As a result of this operation of the drum, the refuse material being supplied thereto is eventually separated into pulverized material, namely, that portion of the material which can be satisfactorily processed within the drum 10, and non-pulverized material which is referred to in the aforementioned U.S. Pat. No. 3,405,873 as "rejects". The drum 10 is, of course, mounted for rotation and a regear 13 is provided on the exterior of the drum.

In aforementioned U.S. Pat. No. 3,405,873, electric motors are utilized to accomplish rotation of the drum 10. In contrast, the present invention utilizes a steam turbine generally designated 16, which turbine includes a driven gear 18 that measures with the ring gear 13 so that the steam turbine serves as the power means for rotating the drum. Means 20 shown diagramatically in FIG. 1, but understood to be any suitable form of conventional conveying means, is utilized to direct the non-pulverized material which emerges from the outlet end 14 of the drum to a furnace generally designated 22. If it is assumed that all of the non-pulverized material or "rejects" are fed by the means 20 directly to the furnace 22, then such furnace will be able to burn and consume a large quantity of such materials, such as rags, boards and the like.

The heat output from the furnace 22 is directed to a steam generating unit generally designated 24 which can be in the form of a conventional steam boiler. As such, the heat from the furnace heats water passing through the unit 24 to create a supply of steam, and this steam supply is then directed through lines 26 and 28. The portion of the steam supply passing through the line 26 is directed to the steam turbine 16 to power the same and hence to cause rotation of the drum 10. That portion of the steam which passes through the line 28 is introduced into the interior of the drum at the inlet end 12 thereof. Specifically, the steam passing through the line 28 enters through the nozzle 48 at the inlet end of the drum and the steam is thus admixed with the refuse material being introduced into the drum, to thereby assist in its pulverization.

The furnace 22 can be a known conventional type of pyrolysis furnace or it can be a gratuated heat furnace such as that disclosed in U.S. Pat. No. 3,339,905, issued Sept. 5, 1967 to K. Tezuka, the details of which are hereby incorporated by reference.

As can be seen from FIG. 1, there is shown in dotted lines therein a block designated 30 through which the conveying means 20 passes as it delivers non-pulverized material from the drum 10 to the furnace 22. While this block 30 is optional, it is intended to include therein, those items of equipment as illustrated in FIG. 2. As can be seen therein, the conveying means 20 delivers the non-pulverized materials on to a conveyor 44 which delivers such materials into an air separator 50 via the inlet opening 52 thereof. A series of high pressure air blowers 55 are arranged intermediate a series of descending ramps 56 which lead toward a lower outlet opening 54. The air blast from these blowers 55 lift the lighter materials, such as plastics, upwardly and forwardly to discharge the same through an upper outlet opening 53 from which they pass via a conveyor 57 to a recycling apparatus 58.

The heavier non-pulverized materials discharging through the outlet 54 drop onto a conveyor 61 at its forward end 62. As such materials moves along the conveyor 61, it reaches a region 63 spaced beneath the forward end 65 of a magnetic conveyor 60. Any ferrous metal contained in the material feeding along the conveyor 61 will be attracted at the point 63 onto the magnetic conveyor. A stripping bar 66 is located at the opposite end of the magnetic conveyor 60 and when the ferrous material contacts this stripping bar, it is removed from the magnetic conveyor 60, deposited upon another conveyor 64 and is then transmitted to a collection chamber 68 which can advantageously form the inlet to a baling machine.

That material carried on the conveyor 61 which was non-ferrous material will obviously not be attracted by the magnetic conveyor 60 and, accordingly, it drops off the end of the conveyor 61 into the opening 71 in a conventional hammer mill 70. The hammer mill serves to comminute the material fed therethrough and then deposits the same through its outlet 72 and onto a vibrating screen conveyor 80 in the form of a porous belt 82 operated by a drive motor 81. Because of its fragile nature, most glass material being fed through the hammer mill will be broken and ground to particles much smaller than the metallic or other materials. As such, this finely ground glass material or glass particles will ordinarily drop through the openings 82 in the porous belt and into a collection bin 86. The remaining materials which have not dropped through the belt are deposited into a conveyor 92 which delivers such materials into the inlet opening 94 of the furnace 22. If desired, the materials can be passed through a drier prior to their introduction into the furnace. This will enhance the combustability of the materials. As explained in my aforementioned U.S. Pat. No. 3,802,631, if the furnace is of the graduated heat type, then the various non-ferrous metals fed thereinto will be melted at different temperatures and can be collected separately.

While the foregoing description describes one preferred and one alternative embodiment of my invention, it will be understood that various changes and modifications apparent to those skilled in the art can be made departing from the spirit and scope of the invention as defined in the appended claims.

I claim:

1. In an apparatus for treatment of refuse, which apparatus includes a rotatable drum having an inlet end and an outlet end, a perforated drum wall section adjacent the outlet end for separation of refuse pulverized by rotation of the drum, and vane means within said drum at the perforated wall section which direct refuse back toward said inlet end as said drum rotates, the improvement which comprises:
   a furnace means which is adapted to burn and at least partially consume the non-pulverized refuse which emerges from the outlet end of said drum;
   means for directing the non-pulverized refuse which emerges from the outlet end of said drum to said furnace means;
   steam generating means coupled with said furnace means to produce a supply of steam in response to heat supplied by said furnace means;
   steam turbine means connected with said drum to cause rotation of said drum; and
   means for directing at least a portion of said steam supply to said steam turbine means to power the same.

2. The improvement as defined in claim 1 wherein said drum has a ring gear mounted thereon and wherein said steam turbine means includes a driven gear in meshing engagement with said ring gear.

3. The improvement defined in claim 1 further including means for directing at least a portion of said steam supply into said drum adjacent the inlet end thereof.

4. The improvement defined in claim 1 wherein said means for directing the non-pulverized refuse to said furnace means includes separator means for segregating different types of said non-pulverized refuse.

5. The improvement defined in claim 4 wherein said separator means includes pneumatic separator means for separating said non-pulverized refuse into lighter and heavier constituents.

6. The improvement defined in claim 4 wherein said separator means includes magnetic separator means for separating ferrous and non-ferrous portions of said refuse.

7. The improvement defined in claim 6 further including comminuting means for reducing the non-ferrous portions into particulate form.

* * * * *